J. P. CALNAN.
RAKE.
APPLICATION FILED DEC. 28, 1916.
1,304,941.
Patented May 27, 1919.
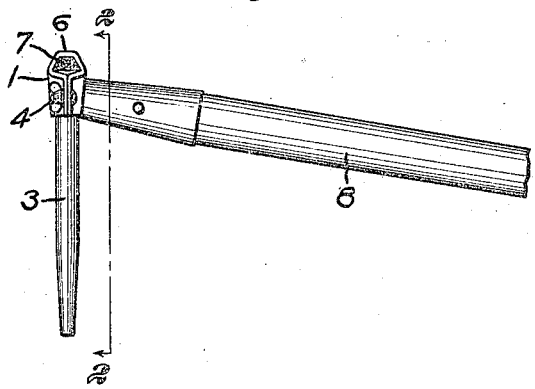
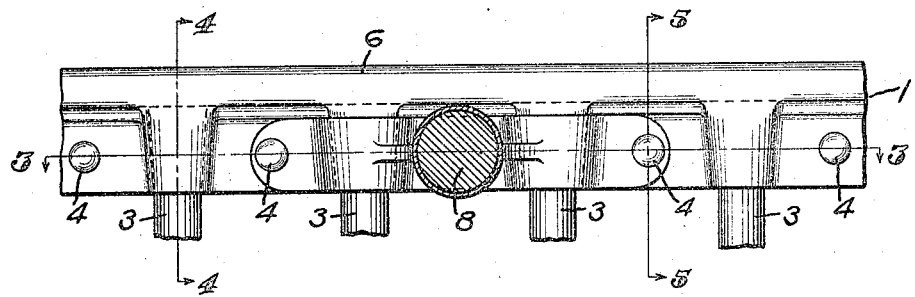
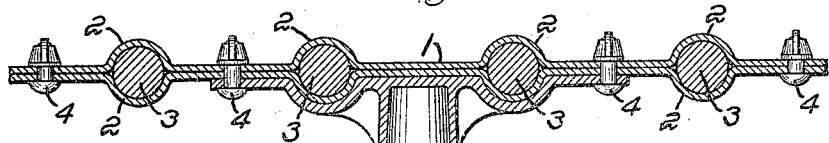
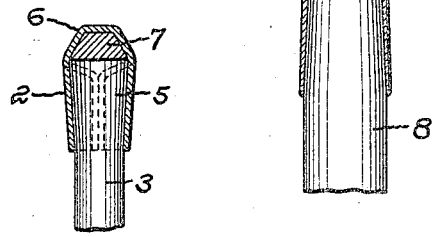
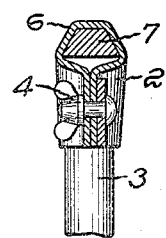
Inventor:
James P. Calnan,
by Emery, Booth, Janney & Varney
Attys

UNITED STATES PATENT OFFICE.

JAMES P. CALNAN, OF SOUTHBORO, MASSACHUSETTS.

RAKE.

1,304,941. Specification of Letters Patent. Patented May 27, 1919.

Application filed December 28, 1916. Serial No. 139,261.

*To all whom it may concern:*

Be it known that I, JAMES P. CALNAN, a citizen of the United States, and a resident of Southboro, county of Worcester, and State of Massachusetts, have invented an Improvement in Rakes, of which the following description, in connection with the accompanying drawings, is a specification, like characters on the drawings representing like parts.

My invention relates to improvements in rakes and consists in part of a rake-head so formed as to permit the removal of damaged or broken teeth, and the replacement thereof by new ones without disturbing the other rake teeth. Other improvements will appear in the following specification, and as more particularly pointed out in the appended claims.

In the drawings, Figure 1 is a side elevation of one illustrative embodiment of my invention;

Fig. 2 is a partial and enlarged view looking toward the left in Fig. 1;

Fig. 3 is a section taken on the line 3—3 of Fig. 2;

Fig. 4 is a section taken on the line 4—4 of Fig. 2; and

Fig. 5 is a section taken on the line 5—5 of Fig. 2.

The rake-head is shown at 1 and is preferably made of some light and strong metal, although any suitable material may be used in its construction. I prefer to form the head 1 from one piece of material, so shaping it that when bent or folded into the form shown, its two long edges will form sockets 2 in which the teeth 3 may be held by the camber of the head or by the pressure of the set screws 4.

The sockets 2 may be shaped to prevent the teeth falling out, and in this instance I have shown them to be tapered and generally conical in form, with the butts 5 of the teeth 3 made to fit the sockets so shaped.

I prefer also to fold or bend the material in forming the rake-head so that a straight-edged ferrule 6 will be formed by the back or top of the rake-head, thus making such a rake useful in smoothing ground or surface hoeing by merely inverting the rake and using the back instead of the teeth. A strengthening rod 7 of wood or metal may be inserted in the opening formed by bending the metal to make the head, although this is not a necessary element in my invention.

It will be obvious that by loosening the proper screws 4 any or all of the teeth may be removed from the rake-head, not only to replace old or damaged teeth, but to change the number or arrangement of the teeth—an advantage clear to gardeners and other rake-users.

I have shown a convenient form of detachable handle at 8.

I do not wish to be limited to the specific structure shown and described herein, and it is obvious that various departures may be made from the illustrative rake shown without departing from the spirit and scope of my invention.

I claim:

1. In a rake, in combination, a tooth-supporting head formed of a single strip of material folded until opposite edges of said strip approximately meet, and providing tapered sockets wherein rake teeth may be removably held, said sockets terminating at their broader ends in a substantially straight-edged ridge or ferrule along the top of the rake-head, and a series of screws or bolts provided with nuts whereby the component sides of said sockets may be tightened or loosened respectively to grip or release said teeth.

2. In a rake, in combination, a tooth-supporting head formed of a single strip of material folded until the opposite edges of said strip approximately meet, and providing sockets wherein rake teeth may be removably held, and having a substantially straight-edged ridge or ferrule along the top thereof; and a series of screws or bolts whereby the component sides of said sockets may be tightened or loosened respectively to grip or release said rake teeth.

3. In a rake, in combination, a tooth-supporting head formed of a single piece of material folded until opposite edges of said piece approximately meet, and providing sockets wherein rake teeth may be removably held, and having a substantially straight-edged ridge or ferrule along the top of the rake head; and means whereby the component sides of said sockets may be tightened or loosened respectively to grip or release said teeth.

4. In a rake, in combination, a tooth-supporting head formed of a single piece of material folded so that opposite portions of said piece form tubular sockets wherein rake teeth may be removably held, and means providing for expansion or contraction of said sockets respectively to release or grip said teeth.

5. A rake-head formed of a single strip of metal died to provide sockets for the retention of rake teeth and provided with a hollow top approximating in width the diameter of the top of the sockets and having a raised ground-smoothing surface or ridge for stiffening the tooth engaging portions of the rake-head.

6. In a rake, in combination, a tooth-supporting head 1 formed of a single metallic strip provided with oppositely positioned elements shaped to form tubular retainers 2 for teeth, and means for connecting said opposite elements whereby said teeth may be clamped therebetween and separately released therefrom.

7. In a rake, in combination, a tooth-supporting head 1 formed by a piece of material so shaped that opposite edges of said piece approximately meet forming tubular sockets 2 wherein rake teeth 3 may be separately removably held, and having a substantially straight edged ferrule 6 along the top of the rake-head; and means 4 whereby said teeth may be gripped and released, the top portion of said head providing an abutment opposing upward displacement of said teeth.

8. A rake-head formed of a single folded strip of metal died to provide tapered sockets for the retention of rake teeth and having a hollow top approximating in width the diameter of the top of the sockets and having a raised ground-smoothing surface or ridge for stiffening the tooth engaging portions of the rake-head, the opposite sides of said strip of metal being yieldingly separable for the insertion or removal of individual rake teeth and having clamping means for closure of said tapered sockets and the rigid retention of rake teeth therein.

9. A rake-head comprising, in combination, sheet metal sockets formed of died sheet metal, means for drawing opposite sides of said sockets together to grip the rake teeth, and a died hollow rib extending longitudinally of the top of the rake-head forming a stiffening element therefor, said rib being formed to provide a ground-smoothing surface for the top of the rake-head.

In testimony whereof, I have signed my name to this specification.

JAMES P. CALNAN.